US010016089B2

(12) United States Patent
Necsuliu

(10) Patent No.: US 10,016,089 B2
(45) Date of Patent: Jul. 10, 2018

(54) PORTABLE APPARATUS FOR COOKING FOODS, IN PARTICULAR MEAT

(71) Applicant: Gheorghe Necsuliu, None (IT)

(72) Inventor: Gheorghe Necsuliu, None (IT)

( * ) Notice: Subject to any disclaimer, the term of this patent is extended or adjusted under 35 U.S.C. 154(b) by 722 days.

(21) Appl. No.: 14/577,119

(22) Filed: Dec. 19, 2014

(65) Prior Publication Data

US 2015/0182075 A1 Jul. 2, 2015

(30) Foreign Application Priority Data

Dec. 31, 2013 (IT) .............................. TO2013A1092

(51) Int. Cl.
*A47J 37/07* (2006.01)

(52) U.S. Cl.
CPC ....... *A47J 37/0704* (2013.01); *A47J 37/0763* (2013.01); *A47J 37/0786* (2013.01)

(58) Field of Classification Search
CPC ..... A47J 37/07; A47J 37/0704; A47J 37/0763
USPC ............................................... 126/222, 25 R
See application file for complete search history.

(56) References Cited

U.S. PATENT DOCUMENTS

| 3,550,525 A * | 12/1970 | Rabello ............... A47J 37/0718 126/25 R |
| 4,700,618 A * | 10/1987 | Cox, Jr. ................... A21B 1/28 126/25 R |
| 5,768,977 A | 6/1998 | Parris et al. |
| 6,841,759 B2 * | 1/2005 | Elwedini ............. A47J 37/0676 219/386 |
| 2006/0000365 A1 * | 1/2006 | Attie .................... A47J 37/0652 99/340 |
| 2007/0277800 A1 | 12/2007 | Chiang |

FOREIGN PATENT DOCUMENTS

| DE | 202005016084 U1 | 1/2006 |
| GB | 2020167 A | 11/1979 |

OTHER PUBLICATIONS

Search Report and Written Opinion for Italian Patent Application No. TO2013A001092 issued by European Patent Office.

* cited by examiner

*Primary Examiner* — Avinash Savani
*Assistant Examiner* — Aaron Heyamoto
(74) *Attorney, Agent, or Firm* — Howson & Howson LLP

(57) ABSTRACT

A portable apparatus for cooking foods, in particular meat, comprising a vertically positioned body (12) having a surface, a bottom and a top. The apparatus comprises a bearing (15) applied to the bottom and arranged for allowing to move the apparatus (10), a grill (29) located at the top and arranged to cook horizontally lying foods and a first cover (25) positioned near the bottom and internally to the body, the first cover designed for supporting solid combustible material. The apparatus further comprises bars (31) horizontally linkable or linked, in use, externally to the surface of the body, near the top of the body, and arranged for vertically suspending, by means of cooking hooks, foods to be cooked, and one or more extractable drawers (23), positioned between the bottom and the first cover (25) and aligned to the bars, and arranged for collecting cooking residues leaving the vertically suspended foods.

15 Claims, 3 Drawing Sheets

PORTABLE APPARATUS FOR COOKING FOODS, IN PARTICULAR MEAT

BACKGROUND

The present invention relates, in general, to an apparatus for cooking foods such as meats of pork, beef, fish, etc.

In particular, the present invention relates to an apparatus commonly called barbecue—term preferably used hereinafter,—which allows cooking meats or other foods by embers or flames arranged almost in direct contact with them.

For example, known barbecues can be of the fixed type, made of brick or masonry and preferably positioned on the outside of buildings, or of the mobile type.

Mobile barbecues, to which reference is made hereinafter, preferably have a frame or metal body comprising a zone in which the embers or the cooking flames are produced and a zone in which the foods to be cooked are arranged.

A special grill is adapted to separate the two zones and to support the foods so that they are cooked by the embers or flames, to which hereinafter we will refer as flame or flames, as the embers can also generate flames.

A general problem with known barbecues is that from time to time foods during cooking can be burnt by the flames or smoked by the smoke generated by the flames. As is known, if the foods, such as meat, are burnt or smoked, harmful substances can be captured by the foods so that their ingestion can become dangerous for those who eat them.

The Applicant has observed that, in general, the prior art is not able to effectively solve the problem of cooking foods with a barbecue without these being at risk of being burnt or smoked to the point of becoming detrimental to the health of those who eat them.

SUMMARY

The object of the present invention is to solve the above problems of the prior art. This object is achieved by the portable apparatus for cooking foods, in particular meat, as claimed.

The claims are an integral part of the technical teaching provided herein in regard to the invention.

The following brief description of the invention is given in order to provide a basic understanding of some aspects of the invention.

This brief description is not an extensive description and as such it must not be understood as being adapted to identify key or critical elements of the invention, or adapted to outline the scope of the invention. Its sole purpose is to present some concepts of the invention in a simplified form as a preview to the detailed description below.

According to a feature of a preferred embodiment, the apparatus comprises a body having a surface to which one or more bars are horizontally linkable or linked externally to the body, and arranged for vertically suspending, by means of proper cooking hooks, foods to be cooked, and one or more extractable drawers positioned in a position lower than the bars, under the bars, and arranged for collecting possible cooking residues leaving the vertically suspended foods.

According to a further feature of the present invention, the bars comprise a plurality of grooves arranged for suspending the foods at different distances from the body surface.

According to a another feature of the present invention, the extractable drawers comprise, in use, a layer of sand or other material arranged to soak up the cooking residues leaving the foods.

According to the present invention an opening or fitting designed so as to be connectable to a flue is provided on the surface of the body.

BRIEF DESCRIPTION OF THE DRAWINGS

These and other characteristic features and advantages of the present invention will become clear from the following description of a preferred embodiment provided purely by way of non-limiting example, with reference to the accompanying drawings, wherein elements indicated with the same or similar reference numerals indicate elements that have the same or similar functionality and construction and in which.

DETAILED DESCRIPTION

Figure 1:
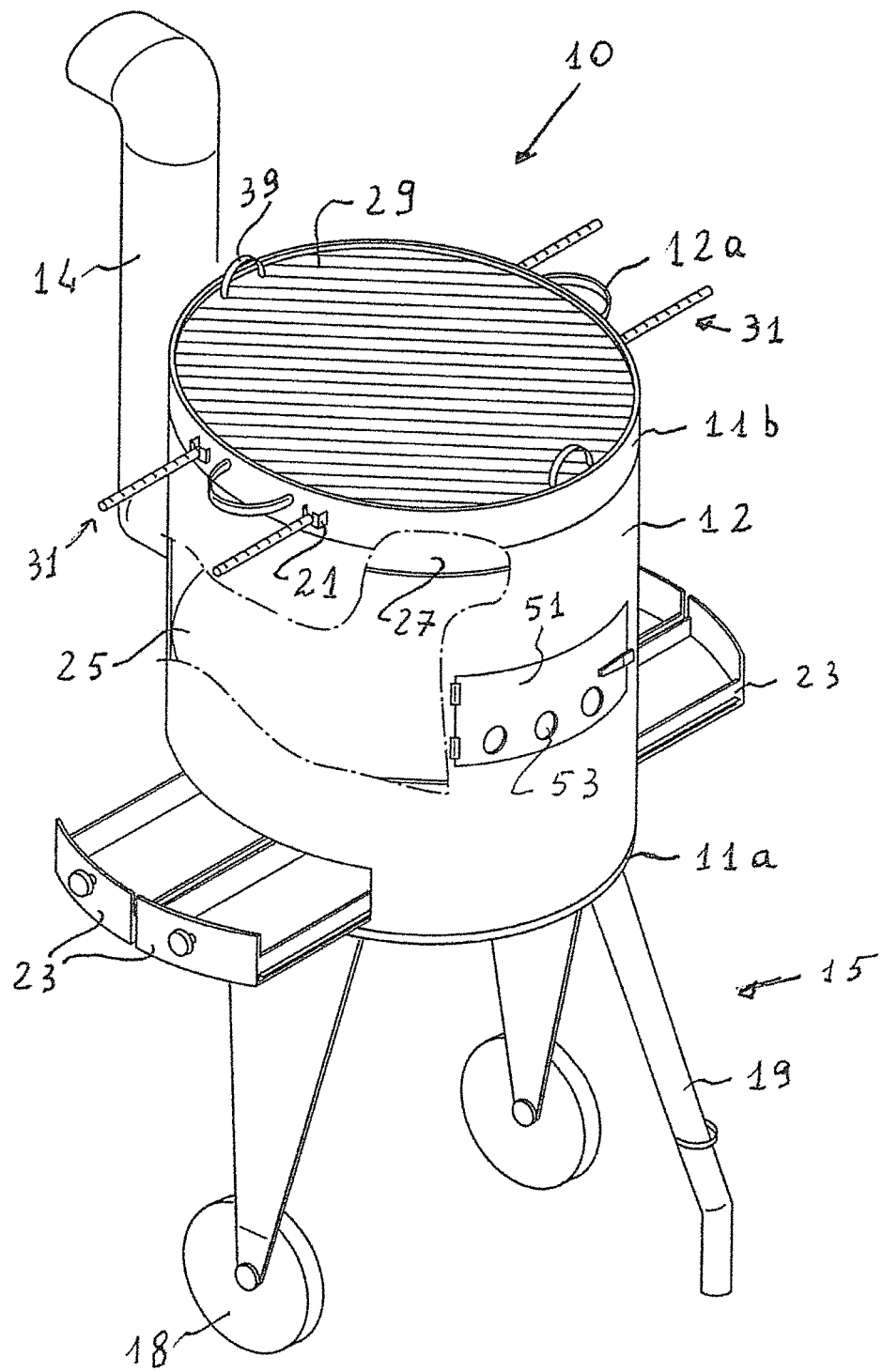
FIG. 1 shows a perspective view of an apparatus for cooking foods according to the invention.
Figure 2:
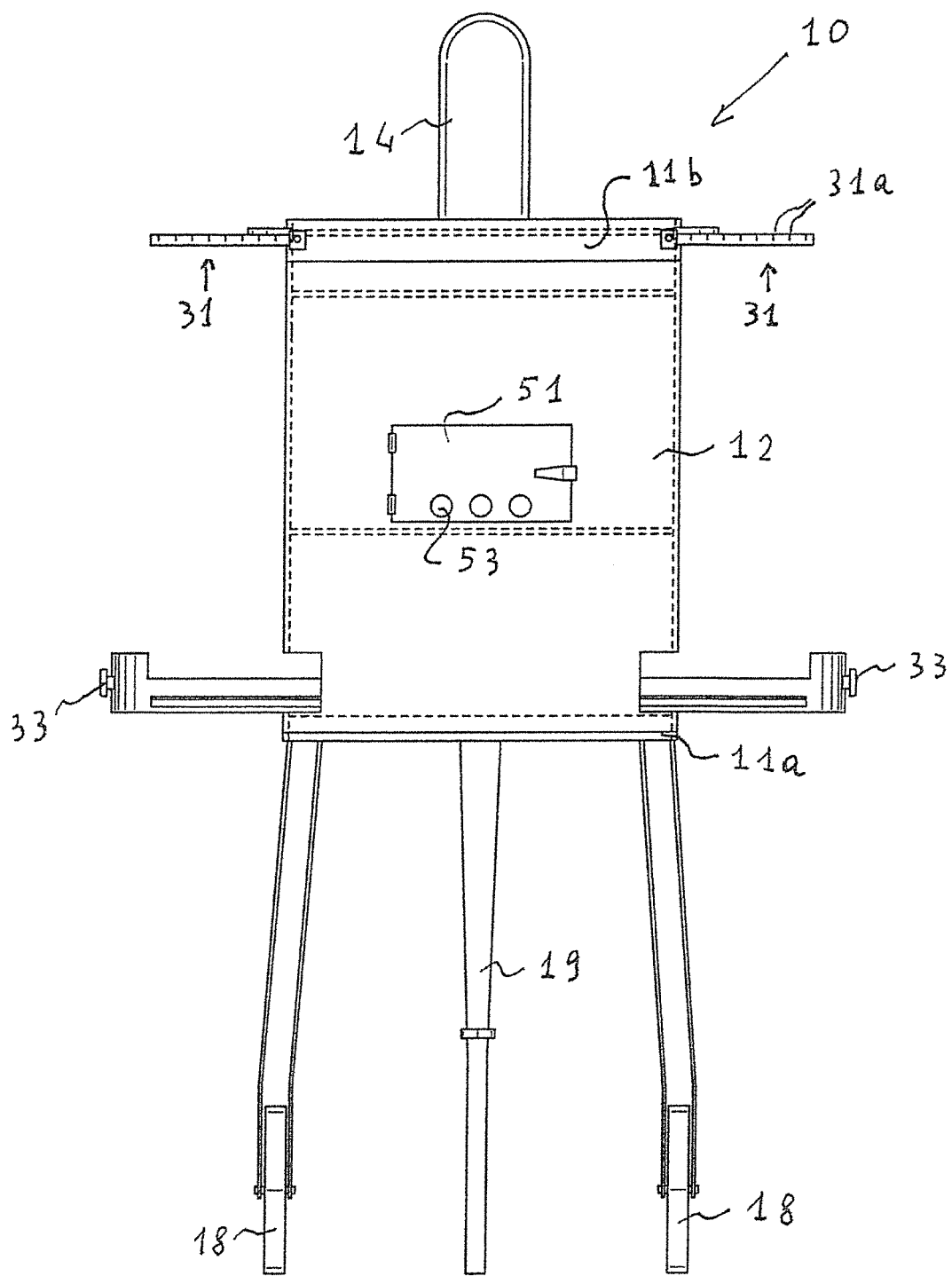
FIG. 2 shows a frontal view of an apparatus for cooking foods according to the invention.
Figure 3:
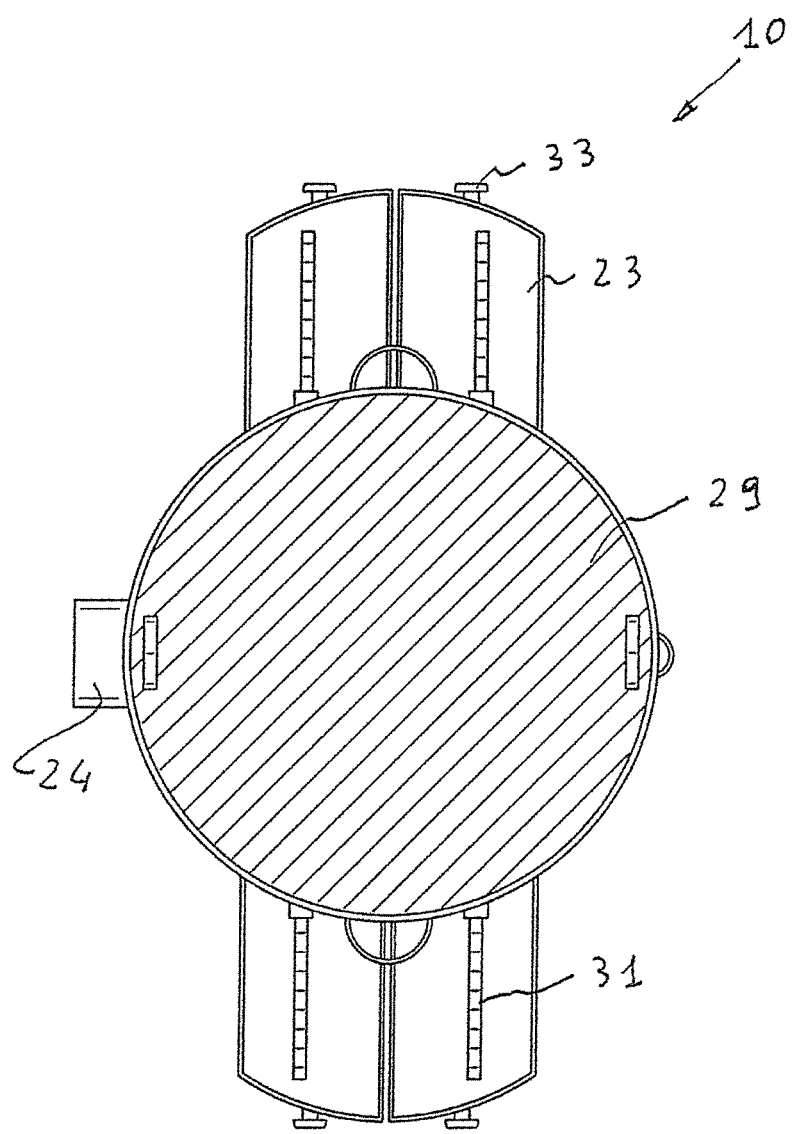
FIG. 3 shows a top view of an apparatus for cooking foods according to the invention.

With reference to FIG. 1, an apparatus for cooking meats (barbecue) 10 according to the present invention comprises a vertically positioned body 12, for example a body with a cylindrical surface, having a bottom and a top. The body comprises a set of components adapted to allow to realize the barbecue 10.

The body 12, in the preferred embodiment, is made of carbon steel sheet metal preferably sanded and coated at least on the outer surface with a paint that is non-toxic under high temperature conditions, for example the paint type HTA25 of the Company MILAI S.r.l.

According to other embodiments, the body can have other shapes, for example parallelepiped shape, it can be made of materials other than the specified one, provided that they are non-toxic and resistant to high temperatures, for example about 600° C., it can be covered, on its outer and/or inner surface with a non-toxic and high temperature resistant, or it can be uncovered with paint.

According to further embodiments, the body 12 may be coated, on its outer and/or inner surface, for example, with a paint consisting of ceramic enamel.

Preferably, in all embodiments, a first reinforcing edge 11a adapted to confer strength to the body 10 of the barbecue is provided at the bottom of the body 12.

Preferably, a second reinforcing edge 11b configured to confer strength to the body and, for example, to support some components of the barbecue is provided at the top of the body.

In particular, according to the preferred embodiment, at least two handles 12a adapted to enable carrying of the barbecue, for example by loading it onto a car or other transportation means, are fixed to the second reinforcing edge 11b.

Preferably, the first reinforcing edge has a vertical height of 0.5-1.5 cm and the second reinforcing edge has a vertical height of 3-7 cm.

At the bottom of the body, the barbecue comprises one or more drawers 23 extractable from the body and preferably having lowered edges and being provided with respective drawer handles 33.

In the preferred embodiment there are 4 drawers 23 arranged 2 by 2 on opposite sides of the body and slidable on guides provided, for example, just above the first reinforcing edge a.

The drawers 23, in use, are kept extracted from the body, facilitate the inflow of air to the fuel thanks to the lowered edges and include a layer of sand or other material, adapted to soak up, for example, cooking residues leaving the foods, such as fat, oil, etc., as will be described in detail for the operation.

In an upper zone of the body, preferably inside the second edge 11b, for example at a distance of 2-6 cm from the top of the body, and, even more preferably, in an intermediate position with respect to the drawers 23 when extracted, the barbecue comprises hooking elements (hooks) 21, for example fixed to the upper edge 11b, adapted to allow to hook supports for food (supports) 31, for example bars arranged, in use, in a horizontal direction externally to the surface of the body.

Preferably, the bars 31 are made of stainless steel and, most preferably, they comprise one or more grooves 31a along their length which are adapted, when in use, to be used for vertically suspending, by means of proper hooks, foods to be cooked at different distances from the surface of the body, as will be described in detail hereinafter.

The hooks for foods are preferably rotatable in order to expose the foods to cooking on different sides. In fact, the cooking of foods hanging on the bars occurs by radiation of heat from the outer surface of the body of the barbecue.

In the preferred embodiment, the bars 31 are fixed to the hooks 21 by screwing.

According to other embodiments, the bars 31 are fixed to the hooks by interlocking or by other arrangements of common use.

In accordance with the preferred embodiment, a first cover 25 is provided in the body 12 just above or slightly above the drawers 23, for example at a vertical distance of 2-10 cm; preferably the first cover 25 is not perforated and is adapted to support, in use, solid type combustible material, such as wood, charcoal, etc.

Even more preferably, the solid combustible material is wood.

The lower cover 25 is preferably made of the same material as the body 12 and is supported by suitable supports arranged along the inner periphery of the body.

Conveniently, an opening door 51 is provided in one side of the body 12, preferably with its base located near the first cover 25.

The door 51 comprises, preferably at its bottom, a plurality of holes 53 arranged to let air flow to the combustible material for facilitating combustion thereof.

Naturally, in other embodiments, other solutions such as holes or slots on the surface of the body may be provided in order to let air flow to the combustible material.

The door 51, in the described example, is laterally hinged, but nothing prevents it from being hinged on any of the other sides.

Vertically along the body 12, preferably at the hooks 21 and internally to the surface of the body, a second cover 27 is provided, which preferably is not perforated.

Even more preferably, the barbecue 10 comprises a grill 29 positioned above the hooks 21 for the bars 31 and near the top of the body, for example at a distance of 0.5-1.0 cm, for cooking horizontally lying foods.

The second cover 27 is vertically positioned in a position lower than the grill 29 and, in use, is covered with sand or other material arranged for collecting possible cooking residues leaving the horizontally lying foods and, in use, is covered with sand or other material resistant to high temperatures and arranged to soak up, for example, cooking residues leaving the foods, such as fat, oil, etc., and to cook food by radiation, as will be described in detail for the operation.

Preferably, the second cover 27 is made of the same material as the body 12 while the grid 29 is preferably made of stainless steel and configured to be easily removable from the top of the body, for instance by means of appropriate handles 39 applied to the grid.

Both the second cover 27 and the grid 29 are supported in position by suitable supports arranged along the inner periphery of the body 12.

In the preferred embodiment, laterally to the body 12, for example in a position opposite to the door 51 and in a position vertically lower than the second cover 27, for example 2-5 cm, there is provided an opening 24 or fitting for a flue 14.

The opening is designed so as to be easily connectable to a flue 14, which in the preferred embodiment is extendable and adjustable at will in a known manner.

The opening 24 for the flue 14 is preferably configured so that, in use, when it is connected to the flue, prevents the escape of fumes at the connection to the flue 14.

In the preferred embodiment, the barbecue 10 comprises a bearing 15 applied or applicable in use to the bottom of the body 12 and having at least a pair of side wheels 18 adapted to move the grill 10, and at least one central support 19 for example adjustable in height, and arranged, in the form of at least a tripod, to keep the barbecue 10 in balance. Preferably, the central support 19 is linkable in a known manner to a rod or bar known per se and arranged for facilitating movement of the barbecue 10.

The operation of the barbecue 10 as described is the following.

Initially, the barbecue is placed in an appropriate place and is preferably connected to the flue 14.

The presence of the flue also allows to place the barbecue 10 in an apartment of an apartment building if it is possible, for example, to connect the flue 14 to a flue of the apartment building.

Advantageously, in this case the barbecue can be used within the apartment without disturbing the people living in the condominium.

Subsequently to the above initial operations, the drawers 23 are extracted, the grill 29 is optionally extracted and a layer of sand is deposited in the drawers and onto the surface of the top cover 27.

Finally the bars 31 are connected to the hooks 21 and possibly the grill 29 is repositioned onto the dedicate supports.

At this point the barbecue is ready for use.

Subsequently, wood or charcoal is inserted onto the first cover or lower cover 25 through the door 51 and the combustible material is ignited.

According to the present embodiment, the ignition of the combustible material is facilitated by the presence of the holes 53 at the base of the door 51 and of the lowered edges provided in the drawers 23.

Once the fire is lit, it is possible to suspend foods from the bars 31 by means of the cooking hooks and/or to place foods onto the grill 29.

Preferably, the cooking hooks in addition to being rotatable may be of various types, for example gaff-like hooks, known per se, for suspending foods, or even double grills, known per se, adapted to contain foods such fishes or other foods that otherwise would become detached from the gaff-like hooks.

The cooking of foods suspended from the bars 31 is carried out by means of heat radiation from the outer surface of the body 12 which in any case is non-toxic at high temperatures.

The cooking of foods placed on the grid 29 occurs, for example, by radiation from the sand deposited on the top cover 27.

In all cases, thanks to the presence of the top cover 27 and the flue, the foods are not lapped by the fire or reached by the smoke, and any fats exiting from the foods or any oils or seasonings added during cooking end up in the sand of the drawers or in the sand placed on the top cover 27 without contaminating foods with harmful substances.

Moreover, the presence of the flue, besides facilitating draft of the fire, allows the removal of smoke from foods and from the persons doing the cooking.

The barbecue as described allows the cooking of foods without them coming into direct contact with the flame and/or with the smoke generated by the flame.

Moreover, thanks to the structure of the grill as described, any fats melted by the heat are retained by the sand so as to allow a cooking in which the foods are free from harmful substances.

The cooking of foods suspended from bars is fast and thanks to the fact that at least the outer surface of the body is, for example, covered with a paint that is non-toxic under high temperature conditions, this guarantees a cooking in which the foods are free from harmful substances.

Of course, obvious changes and/or variations of the above description are possible, in dimensions, shapes, materials and components, as well as in the details of the illustrated construction and in the method of operating without departing from the scope of the invention as defined in the appended claims.

I claim:

1. A portable apparatus for cooking foods, in particular meat, comprising:
    a vertically positioned body including
        a body surface coated at least on a body outer surface with a material non-toxic at high temperature, and
        a bottom and a top;
    a bearing applied or applicable to the bottom of the body and arranged for allowing to move the apparatus;
    a grill located at the top of the body and arranged to cook horizontally lying foods;
    a first cover positioned near the bottom of the body and internally to the body, said first cover being designed for supporting solid type combustible material;
    one or more bars horizontally linkable or linked, in use, to the body outer surface and extending externally of the body, near the top of the body, and arranged for vertically suspending, by way of proper cooking hooks, foods to be cooked; and
    one or more extractable drawers, positioned between the bottom of the body and the first cover, aligned to the one or more bars, and arranged for collecting possible cooking residues leaving the vertically suspended foods;
    a second cover positioned near the top of the body in a position lower than the grill, and covered with sand or other material, the grill being arranged to cook by heat radiation from the sand or the other material the horizontally lying foods;
    whereby cooking of said foods suspended to the one or more bars occurs by radiation of heat from the body outer surface.

2. The apparatus according to claim 1, wherein the one or more bars comprise a plurality of grooves arranged for suspending the foods at different distances from the body outer surface.

3. The apparatus according to claim 2, wherein the one or more extractable drawers comprise, in use, a layer of sand or other material arranged to soak up the cooking residues leaving the foods.

4. The apparatus according to claim 3, wherein between the first cover and the second cover an opening or fitting is provided designed so as to be connectable to a flue.

5. The apparatus according to claim 4, wherein on the body surface in a position higher than the first cover a door is provided arranged for inserting the combustible material on the first cover.

6. The apparatus according to claim 5, wherein the door comprises a plurality of holes arranged to let air flow to the combustible material for facilitating combustion thereof.

7. The apparatus according to claim 6, wherein said bearing comprises at least a pair of wheels arranged for allowing to move the apparatus.

8. The apparatus according to claim 7, wherein said bearing is linkable to a rod or bar arranged for facilitating movement of the apparatus.

9. The apparatus according to claim 1, wherein the one or more extractable drawers comprise, in use, a layer of sand or other material arranged to soak up the cooking residues leaving the foods.

10. The apparatus according to claim 1, wherein between the first cover and the second cover an opening or fitting is provided designed so as to be connectable to a flue.

11. The apparatus according to claim 1, wherein on the body surface in a position higher than the first cover a door is provided arranged for inserting the combustible material on the first cover.

12. The apparatus according to claim 11, wherein the door comprises a plurality of holes arranged to let air flow to the combustible material for facilitating combustion thereof.

13. The apparatus according to claim 1, wherein said bearing comprises at least a pair of wheels arranged for allowing to move the apparatus.

14. The apparatus according to claim 13, wherein said bearing is linkable to a rod or bar arranged for facilitating movement of the apparatus.

15. A portable apparatus for cooking foods, in particular meat, comprising,
    a vertically positioned body including,
        a body surface coated at least on a body outer surface with a material non-toxic at high temperature;
    a first cover positioned internally to the body, said first cover being designed for supporting solid type combustible material;
    a grill located at the top of the body;
    a second cover positioned near the top of the body in a position lower than the grill, and covered with sand or other material, the grill being arranged to cook by heat radiation from the sand or the other material the horizontally lying foods;
    one or more bars horizontally linkable or linked, in use, to the body outer surface and extending externally of the body, near a top of the body, and arranged for vertically suspending, by way of proper cooking hooks, foods to be cooked; and
    one or more extractable drawers, positioned between a bottom of the body and the first cover, aligned to the one or more bars, and arranged for collecting possible cooking residues leaving the vertically suspended foods;

whereby cooking of said foods suspended to the one or more bars occurs by radiation of heat from the body outer surface.

\* \* \* \* \*